US012522011B2

(12) United States Patent
Sato et al.

(10) Patent No.: US 12,522,011 B2
(45) Date of Patent: Jan. 13, 2026

(54) TRANSPORT DEVICE AND DROPLET EJECTING DEVICE

(71) Applicant: SEIKO EPSON CORPORATION, Tokyo (JP)

(72) Inventors: Koji Sato, Shiojiri (JP); Shuhei Nishizawa, Shiojiri (JP); Yoshihisa Horikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 66 days.

(21) Appl. No.: 18/171,916

(22) Filed: Feb. 21, 2023

(65) Prior Publication Data

US 2023/0264499 A1 Aug. 24, 2023

(30) Foreign Application Priority Data

Feb. 21, 2022 (JP) ................................ 2022-024772

(51) Int. Cl.

| | |
|---|---|
| ***B41J 29/17*** | (2006.01) |
| ***B41J 11/00*** | (2006.01) |
| ***B65G 45/18*** | (2006.01) |
| *B08B 1/20* | (2024.01) |
| *B41J 15/04* | (2006.01) |

(52) U.S. Cl.
CPC ............ *B41J 29/17* (2013.01); *B41J 11/007* (2013.01); *B65G 45/18* (2013.01); *B08B 1/20* (2024.01); *B41J 15/048* (2013.01)

(58) Field of Classification Search
CPC ........ B41J 29/17; B41J 11/007; B41J 15/048; B65G 45/18; B08B 1/20
See application file for complete search history.

(56) References Cited

FOREIGN PATENT DOCUMENTS

| | | | |
|---|---|---|---|
| JP | H11192694 | 7/1999 | |
| JP | 2006334964 | 12/2006 | |
| JP | 2008-044108 | 2/2008 | |
| JP | 2008044108 A * | 2/2008 | ................ B41J 2/01 |
| JP | 2009-029047 | 2/2009 | |
| JP | 2009029047 A * | 2/2009 | ................ B41J 2/18 |
| JP | 2020-200120 A | 12/2020 | |

* cited by examiner

*Primary Examiner* — Yaovi M Ameh
(74) *Attorney, Agent, or Firm* — WORKMAN NYDEGGER

(57) ABSTRACT

A transport unit includes a glue belt, a cleaning unit, and a support unit. The glue belt can transport a medium. The cleaning unit can clean the glue belt with a cleaning liquid. The support unit includes a support surface capable of supporting a sponge that comes into contact with the glue belt cleaned by the cleaning unit. At least one opening is provided in the support surface.

8 Claims, 7 Drawing Sheets

TRANSPORT DEVICE AND DROPLET EJECTING DEVICE

The present application is based on, and claims priority from JP Application Serial Number 2022-024772, filed Feb. 21, 2022, the disclosure of which is hereby incorporated by reference herein in its entirety.

BACKGROUND

1. Technical Field

The present disclosure relates to a transport device and a droplet ejecting device.

2. Related Art

An image recording device of JP-A-2020-200120 includes a plurality of sponges that are in sliding contact with a surface of an endless belt. The plurality of sponges remove soiled cleaning fluid from the surface of the endless belt.

In such a configuration in which a sponge is pressed against an outer peripheral surface of a transport belt, as in the image recording device according to JP-A-2020-200120, the sponge is compressed in a direction intersecting the outer peripheral surface of the transport belt. Therefore, as a density of the sponge increases relative to a density of the sponge in an unloaded state, it becomes difficult to absorb liquid, or absorbed liquid seeps out, and thus there is a risk that the ability of the sponge to clean the outer peripheral surface of the transport belt may be reduced.

SUMMARY

In order to solve the problem described above, the transport device according to the present disclosure includes a transport member configured to transport a medium, a cleaning unit configured to clean the transport member with a liquid, and a support unit including a support surface configured to support a sponge that comes into contact with the transport member cleaned by the cleaning unit, wherein at least one opening is provided in the support surface.

In order to solve the problem described above, a droplet ejecting device according to the present disclosure includes an ejecting unit configured to eject a droplet on a medium, a transport member configured to transport the medium, a cleaning unit configured to clean the transport member with a liquid, and a support unit including a support surface configured to support a sponge that comes into contact with the transport member cleaned by the cleaning unit, wherein at least one opening is provided in the support surface.

DESCRIPTION OF EXEMPLARY EMBODIMENTS

Figure 1:
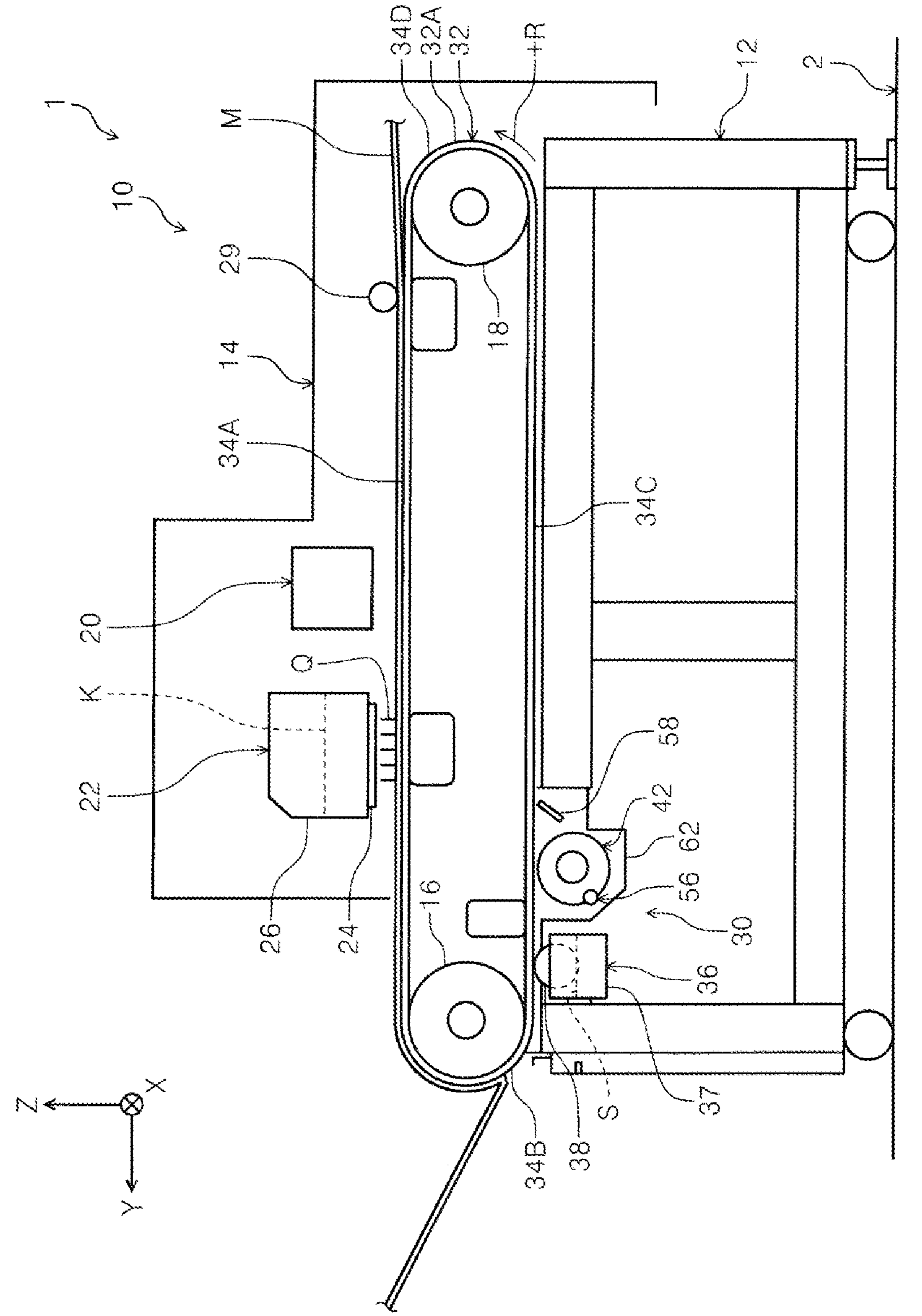
FIG. 1 is a schematic diagram of an internal structure of a printer according to a first embodiment.

Hereinafter, the present disclosure will be schematically described.

A transport device according to a first aspect includes a transport member configured to transport a medium, a cleaning unit configured to clean the transport member with a liquid, and a support unit including a support surface configured to support a sponge that comes into contact with the transport member cleaned by the cleaning unit, wherein at least one opening is provided in the support surface.

According to this aspect, when the sponge comes into contact with the transport member, a compressed portion of the sponge is generated between the support surface and the transport member. Here, a portion of the sponge is released from the compressed state by expanding into the opening provided in the support surface. That is, it is possible to create a portion less likely to be compressed in a part of the sponge. The portion less likely to be compressed has a lower density and a higher ability to absorb the liquid than the compressed portion. Additionally, the liquid in the portion of the sponge that is compressed is internally moved into the portion less likely to be compressed, and thus the liquid seeping out from the compressed portion to the transport member can be suppressed. Thus, it is possible to suppress a decrease in the ability of the sponge to clean the outer peripheral surface of the transport member.

According to a transport device of the second aspect, in the first aspect, the support unit is a rotatable rotary member, and the sponge is provided on the outer periphery of the rotary member, is pressed against the transport member, and is configured to be driven to rotate with respect to the transport member.

Since the sponge is compressed when the liquid is removed from the transport member, a seeping-out action of returning the liquid to the transport member is likely to occur rather than an action of absorbing the liquid in the sponge. Here, in the sponge driven to rotate in which the rotary member rotates in accordance with a transport operation of the transport member, the seeping-out of the liquid to the transport member occurs more conspicuously than in a configuration using a sponge that is not rotated.

According to this aspect, even when the sponge that is driven to rotate is used, a state of the sponge changes from the compressed state to the released state as a part of the sponge expands into the opening. Thus, since the ability to absorb the liquid is ensured by lowering the density of the sponge, it is possible to suppress a decrease in the ability of the sponge to clean the outer peripheral surface of the transport member.

According to a transport device of a third aspect, in the second aspect, the rotary member is a tubular member including an inner peripheral surface, a shaft member that includes an outer peripheral surface facing the inner peripheral surface and that rotatably supports the rotary member, and a squeezing member that squeezes the sponge by pressing the sponge are provided, at least one communication port brought into communication with the at least one opening as the rotary member rotates is provided in the outer peripheral surface, and when a region of the outer peripheral surface aligned with the squeezing member in the radial direction of the rotary member is referred to as a first region, and a region of the outer peripheral surface shifted in the rotational direction of the rotary member with respect to the first region is referred to as a second region, the communication port is provided in the second region.

According to this aspect, when the sponge comes into contact with the squeezing member, the communication port is located in the second region rather than the first region, and thus the state of the sponge is maintained in the compressed state. Thus, the sponge that comes into contact with the squeezing member is less likely to be released from the compressed state, and thus it is possible to suppress a decrease in ability to squeeze the sponge with the squeezing member.

According to a transport device of a fourth aspect, in the third aspect, the shaft member is a tubular member, a negative pressure generating unit that generates a negative pressure inside the shaft member is provided, and the communication port allows communication between the inside and the outside of the shaft member.

According to this aspect, a part of the sponge that is released from the compressed state in the opening further expands into the inside of the shaft member by the negative pressure inside the shaft member generated by the negative pressure generating unit. Thus, since the sponge easily absorbs the liquid, it is possible to further increase the ability to collect the liquid in a part of the sponge.

According to a transport device of a fifth aspect, in the first aspect, the support unit includes a chamber, and a suction unit that sucks a gas inside the chamber is included.

According to this aspect, the state of a part of the sponge is released from the compressed state in the opening, and thus a part of the sponge expands into the inside of the opening. Furthermore, the state of a part of the sponge is a state in which the gas inside the chamber is sucked by the suction unit, and thus a part of the sponge further expands into the inside of the chamber. Therefore, the density of a part of the sponge is reduced, and the ability to absorb the liquid is increased. That is, since the sponge is more likely to absorb the liquid, it is possible to further enhance the ability to collect the liquid in a part of the sponge.

A droplet ejecting device according to a sixth aspect includes an ejecting unit configured to eject a droplet on a medium, a transport member configured to transport the medium, a cleaning unit configured to clean the transport member with a liquid, and a support unit including a support surface configured to support a sponge that comes into contact with the transport member cleaned by the cleaning unit, wherein at least one opening is provided in the support surface.

According to this aspect, when the sponge comes into contact with the transport member, a compressed portion of the sponge is generated between the support surface and the transport member. Here, a part of the sponge is released from the compressed state by expanding into the opening provided in the support surface. That is, it is possible to create a portion less likely to be compressed in a part of the sponge. The portion less likely to be compressed has a lower density and a higher ability to absorb the liquid than a compressed portion. Additionally, the liquid seeping outward from the compressed portion can be suppressed by moving the liquid that seeps out of the compressed portion of the sponge to the portion less likely to be compressed. Thus, it is possible to suppress a decrease in the ability of the sponge to clean the outer peripheral surface of the transport member.

First Embodiment

Hereinafter, a printer 10, which is an example of a droplet ejecting device according to a first embodiment of the present disclosure, and a transport unit 30 will be described in detail.

As illustrated in FIG. 1, the printer 10 is installed on a floor 2 of a factory 1. The printer 10 performs recording on a medium M with a recording unit 22 which will be described below. Examples of the medium M include fabrics and paper. Also, the medium M is drawn from a front surface of the printer 10 as an example. Note that an X-Y-Z coordinate system illustrated in each of the drawings is an orthogonal coordinate system.

An X direction is a device width direction of the printer 10 and is a horizontal direction. When the printer 10 is seen from the front, a direction toward the left in the X direction is a +X direction, and a direction toward the right is a −X direction. Also, the X direction corresponds to a width direction of the medium M.

A Y direction is a depth direction of the printer 10, and is the horizontal direction. When the printer 10 is seen from the front, a forward direction is a +Y direction, and the rearward direction is the −Y direction.

A Z direction is along a gravity direction in which gravity acts. An upward direction in the Z direction is a +Z direction, and a downward direction is a −Z direction. The +Z direction is a device height direction of the printer 10.

The printer 10 includes a device main body 12, a main body cover 14, a transport unit 30, a control unit 20, a recording unit 22, and an operation unit (not illustrated) which will be described below.

The device main body 12 is configured as a base portion on which each unit of the printer 10 is provided. A driving roller 16, a driven roller 18, and a motor (not illustrated) are provided as an example of a driving unit in the device main body 12.

The driving roller 16 is disposed downstream in the +Y direction in the device main body 12. The driven roller 18 is disposed upstream in the +Y direction. Both the driving roller 16 and the driven roller 18 have rotation axes along the X direction. Rotation of the driving roller 16 is controlled by the control unit 20 which will be described below.

The main body cover 14 is an exterior member that covers each unit of the printer 10.

The operation unit includes a touch panel (not illustrated) and an operation button. In the operation unit, an operation of each unit of the printer 10 can be set and operated.

The control unit 20 includes a central processing unit (CPU) functioning as a computer, a memory, and a storage. In part of the memory, a program can be developed. Illustrations of the CPU, the memory and the storage will be omitted. The control unit 20 executes a program to control various operations such as transportation, recording, discharging, cleaning, and the like in each unit of the printer 10.

The recording unit 22 is provided in the device main body 12. Also, the recording unit 22 performs recording on the medium M moving in the +Y direction using an ink K as an example of a recording material. Specifically, the recording unit 22 includes a recording head 24 and a carriage 26 that supports the recording head 24.

The carriage 26 includes a motor (not illustrated) and the like and supports the recording head 24. Also, the carriage 26 is configured to reciprocate the recording head 24 in the X direction.

The recording head 24 includes a plurality of nozzles (not illustrated) and is disposed in the +Z direction with respect to a glue belt 32 which will be described below. The recording head 24 is an example of an ejecting unit capable of ejecting ink droplets Q as an example of a droplet on the medium M. An image can be recorded on the medium M by ejecting ink droplets Q onto the medium M from the recording head 24.

The medium M is an example of a recording medium on which an image is recorded.

Figure 2:
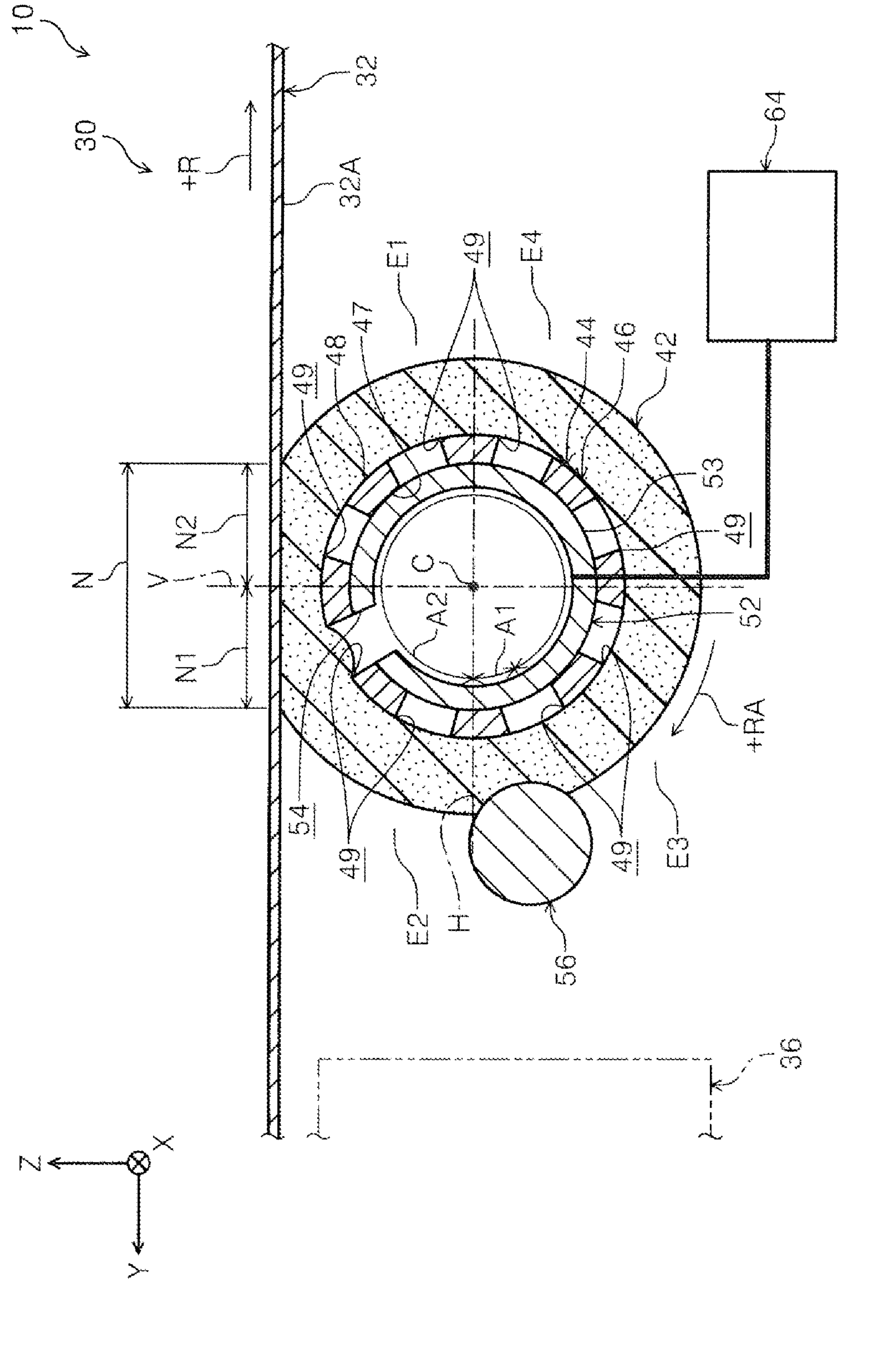
FIG. 2 is a schematic diagram of a cleaning unit and surroundings thereof in the printer according to the first embodiment.

The transport unit 30 is an example of a transport device that transports the medium M. The transport unit 30 includes a glue belt 32, a cleaning unit 36, a sponge 42, and a support unit 44 (FIG. 2). A shaft member 52 (FIG. 2), a squeezing member 56, a cleaning blade 58, a collection tank 62, and a suction unit 64 (FIG. 2) are also provided in the transport unit 30.

The glue belt 32 is an example of a transport member capable of transporting the medium M, and is configured as an endless belt formed by joining both ends of an elastic flat plate. The glue belt 32 is a rubber belt. Also, the glue belt 32 is wound around the driving roller 16 and the driven roller 18. In other words, the glue belt 32 is provided in the device main body 12, and the medium M can be transported in the +Y direction by being moved circularly. A direction of rotation of the glue belt 32 is a +R direction. The glue belt 32 includes an outer peripheral surface 32A.

As an example, the outer peripheral surface 32A is coated with an adhesive (not illustrated) to have adhesiveness, and is capable of supporting and adsorbing the medium M. The "adhesiveness" refers to a property of temporarily adhering to other members and allowing separation from an adhesion state.

A portion of the outer peripheral surface 32A located in the +Z direction from the center of the driving roller 16 and along an X-Y plane is referred to as an upper surface portion 34A. The upper surface portion 34A supports the medium M. A portion of the outer peripheral surface 32A wound around the driving roller 16 is referred to as a curved surface portion 34B. A portion of the outer peripheral surface 32A located in the −Z direction from the center of the driving roller 16 and along the X-Y plane is referred to as a lower surface portion 34C. A portion of the outer peripheral surface 32A wound around the driven roller 18 is referred to as a curved surface portion 34D.

A pressure roller 29 is provided at a position that faces an end portion of the upper surface portion 34A in the −Y direction in the +Z direction. The pressure roller 29 presses the medium M against the outer peripheral surface 32A.

After the medium M is pressed against the outer peripheral surface 32A, the glue belt 32 is moved in the +Y direction to face the recording unit 22. Then, recording is performed on the medium M by the recording unit 22. The medium M recorded by the recording unit 22 is wound by a winding roller (not illustrated) and is then separated from the curved surface portion 34B.

The cleaning unit 36 can clean the glue belt 32 with a cleaning liquid S which is an example of the liquid. The cleaning unit 36 is provided at a position at which it faces an end portion of the lower surface portion 34C in the +Y direction in the −Z direction. The cleaning unit 36 cleans the glue belt 32 after the medium M is separated with the cleaning liquid S, thereby removing the ink K, fibers, and the like adhering to the outer peripheral surface 32A. As an example, the cleaning unit 36 includes a cleaning tank 37, a brush roller 38, and a motor (not illustrated) that drives the brush roller 38 to be rotated.

The cleaning tank 37 is formed in a box shape that opens in the +Z direction. The cleaning liquid S is stored inside the cleaning tank 37.

The brush roller 38 is rotated about a rotary shaft (not illustrated) that extends in the X direction. Both end portions of the rotary shaft in the X direction are supported by the cleaning tank 37. A part of the outer periphery of the brush roller 38 in the −Z direction from a center thereof is immersed in the cleaning liquid S. Also, a part of the outer periphery of the brush roller 38 in the +Z direction from the center thereof is in contact with the outer peripheral surface 32A. A length of the brush roller 38 in the X direction is the same as or slightly longer than a length of the glue belt 32 in the X direction.

The sponge 42 is provided at a position at which it faces the lower surface portion 34C in the −Z direction and a position at which it is located downstream in the +R direction with respect to the cleaning unit 36, that is, in the −Y direction. The sponge 42 is a cylindrical member having a central axis that extends in the X direction. The sponge 42 is a porous elastic body and has an open cell structure consisting of a plurality of cells not illustrated. Each of the cells functions as a chamber capable of accommodating the cleaning liquid S.

When the sponge 42 is compressed in a state in which air and the cleaning liquid S are accommodated inside each of the cells, the air and the cleaning liquid S inside each of the cells are discharged to the outside. Note that when the sponge 42 is compressed, some of the air and the cleaning liquid S may move to other cells, and thus some of the air and the cleaning liquid S may remain inside the sponge 42.

Also, when the state of the sponge 42 returns from a compressed state to an uncompressed state, a negative pressure is generated inside each of the cells, and thus the air and the cleaning liquid S can be absorbed.

As illustrated in FIG. 2, the sponge 42 is supported by a support unit 44 which will be described below. Thus, a part of the sponge 42 can come into contact with the glue belt 32 cleaned by the cleaning unit 36. Specifically, the sponge 42 is provided on the outer periphery of a rotary member 46 which will be described below, is pressed against the glue belt 32 and can be driven to rotate with respect to the glue belt 32.

A portion of the sponge 42 in contact with the outer peripheral surface 32A is in a compressed state of being compressed in the Z direction by being sandwiched between the support unit 44 and the glue belt 32. An entire region in the compressed state of the sponge 42 is referred to as a compressed region N. In FIG. 2, the compressed region N is illustrated as a region having a width N in the Y direction.

The support unit 44 is a rotatable rotary member 46 as an example.

The rotary member 46 is a member that extends in the X direction. The rotary member 46 is rotatable around a shaft member 52 by being supported by the shaft member 52 which will be described later. A rotational direction of the rotary member 46 is referred to as a +RA direction.

As an example, the rotary member 46 is provided in a cylindrical shape including an inner peripheral surface 47 and a support surface 48 that is an outer peripheral surface. An opening 49 is provided in the support surface 48. An inner surface of the sponge 42 is bonded to a portion of the support surface 48 other than the opening 49. In this way, the support unit 44 includes the support surface 48 capable of supporting the sponge 42.

As an example, a plurality of openings 49 are provided at regular intervals in a circumferential direction of the rotary member 46. Each of the openings 49 is provided in a slit shape that extends in the X direction as an example. The plurality of openings 49 may be provided not only in the circumferential direction of the rotary member 46, but also at intervals in the X direction. The number of the plurality of openings 49 arranged in the circumferential direction of the rotary member 46 is eight as an example. Note that the number of openings 49 may be one or a plurality other than eight.

As an example, each of the openings 49 is provided as an end portion of a through hole that passes through the rotary member 46 in a radial direction.

The shaft member 52 is provided in a cylindrical shape having a central axis that extends in the X direction as an example. That is, the shaft member 52 is a tubular member. Both end portions of the shaft member 52 in the X direction are closed. An outer diameter of the shaft member 52 is slightly smaller than an inner diameter of the rotary member 46. The shaft member 52 is inserted inside the rotary member 46. Both end portions of the shaft member 52 in the X direction are supported by a collection tank 62 (FIG. 1) which will be described below. Thus, the shaft member 52 rotatably supports the rotary member 46.

A rotational center of the sponge 42, a rotational center of the rotary member 46, and a rotational center of the shaft member 52 are coincident. The rotational center is referred to as a center C.

Here, when seen in the +X direction from a position in the −X direction, a line passing through the center C in the Z direction is referred to as a vertical line V, and a line passing through the center C in the Y direction is referred to as a lateral line H. In a Y-Z plane, four regions divided by the vertical line V and the lateral line H are referred to as a region E1, a region E2, a region E3, and a region E4.

The region E1 is a region including points located in the −Y direction and the +Z direction with respect to the center C, and corresponds to a first quadrant.

The region E2 is a region including points located in the +Y direction and the +Z direction with respect to the center C, and corresponds to a second quadrant.

The region E3 is a region including points located in the +Y direction and the −Z direction with respect to the center C, and corresponds to a third quadrant.

The region E4 is a region including points located in the −Y direction and the −Z direction with respect to the center C, and corresponds to a fourth quadrant.

The shaft member 52 includes an outer peripheral surface 53 that faces the inner peripheral surface 47 in the radial direction. In the outer peripheral surface 53, one communication port 54 is provided in the +RA direction as an example.

As an example, the communication port 54 can be brought into communication with one opening 49 as the rotary member 46 rotates. The communication port 54 allows communication between the inside and the outside of the shaft member 52. As an example, the communication port 54 is located inside the region E2 when seen in the +X direction. The communication port 54 is located closer to the vertical line V than the lateral line H inside the region E2.

A region of the outer peripheral surface 53 aligned with the squeezing member 56, which will be described below, in the radial direction of the rotary member 46 is referred to as a first region A1. Also, a region of the outer peripheral surface 53 offset in the +RA direction with respect to the first region A1 is referred to as a second region A2.

The communication port 54 is provided in the second region A2. An opening width of the communication port 54 in the +RA direction is substantially equal to an opening width of the opening 49 in the +RA direction as an example.

A portion of the sponge 42 that faces the communication port 54 and the opening 49 which are in a communicated state is located inside the compressed region N and is a portion that is compressed.

A portion of the compressed region N located inside the region E2 is referred to as an upstream region N1. Also, a portion of the compressed region N located inside the region E1 is referred to as a downstream region N2.

As the rotary member 46 rotates in the +RA direction, the sponge 42 is gradually compressed in the upstream region N1, and thus a density thereof is increased. In other words, a volume of a cell of the sponge 42 decreases. Also, as the rotary member 46 rotates in the +RA direction, the sponge 42 is gradually released from the compressed state in the downstream region N2, and thus a density thereof is reduced. In other words, the volume of the cell of the sponge 42 increases.

The squeezing member 56 is a cylindrical member having an axis along the X direction as an example. Most of the squeezing member 56 is located inside the region E3, and the remaining portion is located inside the region E2. Also, a part of an outer peripheral portion of the squeezing member 56 enters the outer peripheral portion of the sponge 42. In this way, the squeezing member 56 squeezes the sponge 42 by pressing the sponge 42 in the radial direction of the sponge 42. In other words, the squeezing member 56 compresses the sponge 42 and thus discharges the cleaning liquid S inside the sponge 42 to the outside.

As illustrated in FIG. 1, the cleaning blade 58 is located in the −Y direction with respect to the sponge 42 and downstream in the +R direction. A tip end portion of the cleaning blade 58 comes into contact with the outer peripheral surface 32A. In this way, the cleaning blade 58 can collect foreign matter or the like that could not be completely collected by the sponge 42.

The collection tank 62 is formed in a box shape that opens in the +Z direction. When seen in the +X direction, the collection tank 62 covers a part of the sponge 42, the rotary member 46, the shaft member 52 (FIG. 2), the squeezing member 56, and a part of the cleaning blade 58. The collection tank 62 can collect the cleaning liquid S and the like that is discharged from the sponge 42 to the outside by the squeezing member 56 or the like, and the cleaning liquid S and the like that is scraped by the cleaning blade 58.

As illustrated in FIG. 2, the suction unit 64 is coupled to the shaft member 52. The suction unit 64 is an example of a negative pressure generating unit that generates a negative pressure inside the shaft member 52. In the suction unit 64, a fan (not illustrated) is rotated to bring a state inside the shaft member 52 into a negative pressure state. The suction unit 64 can change the negative pressure by changing an air volume. That is, the suction unit 64 can perform absorption to an extent that a part of the sponge 42 expands into the opening 49 that is in communication with the communication port 54.

Next, the operation of the printer 10 and the transport unit 30 will be described.

As illustrated in FIG. 1, in the printer 10, the medium M is transported as the glue belt 32 is moved circularly. Recording is performed by the recording unit 22 on the medium M that is transported. The medium M after recording is separated from the glue belt 32.

After the medium M is separated, the outer peripheral surface 32A of the glue belt 32 is cleaned by the cleaning unit 36. At this time, some of the cleaning liquid S may remain on the outer peripheral surface 32A after cleaning. The outer peripheral surface 32A after cleaning is moved in the −Y direction and comes into contact with the sponge 42.

As illustrated in FIG. 2, a portion of the sponge 42 located in the compressed region N is compressed in a direction including at least a component in the Z direction. Then, a frictional force acting on a contacting portion between the sponge 42 and the outer peripheral surface 32A acts on the sponge 42 as a transport force. Thus, the sponge 42 and the rotary member 46 are driven to rotate in accordance with the movement of the glue belt 32 in the +RA direction. Note that a portion of the sponge 42 that faces the opening 49 is not subjected to a negative pressure while it faces the outer peripheral surface 53, and thus it is difficult to expand.

Figure 3:
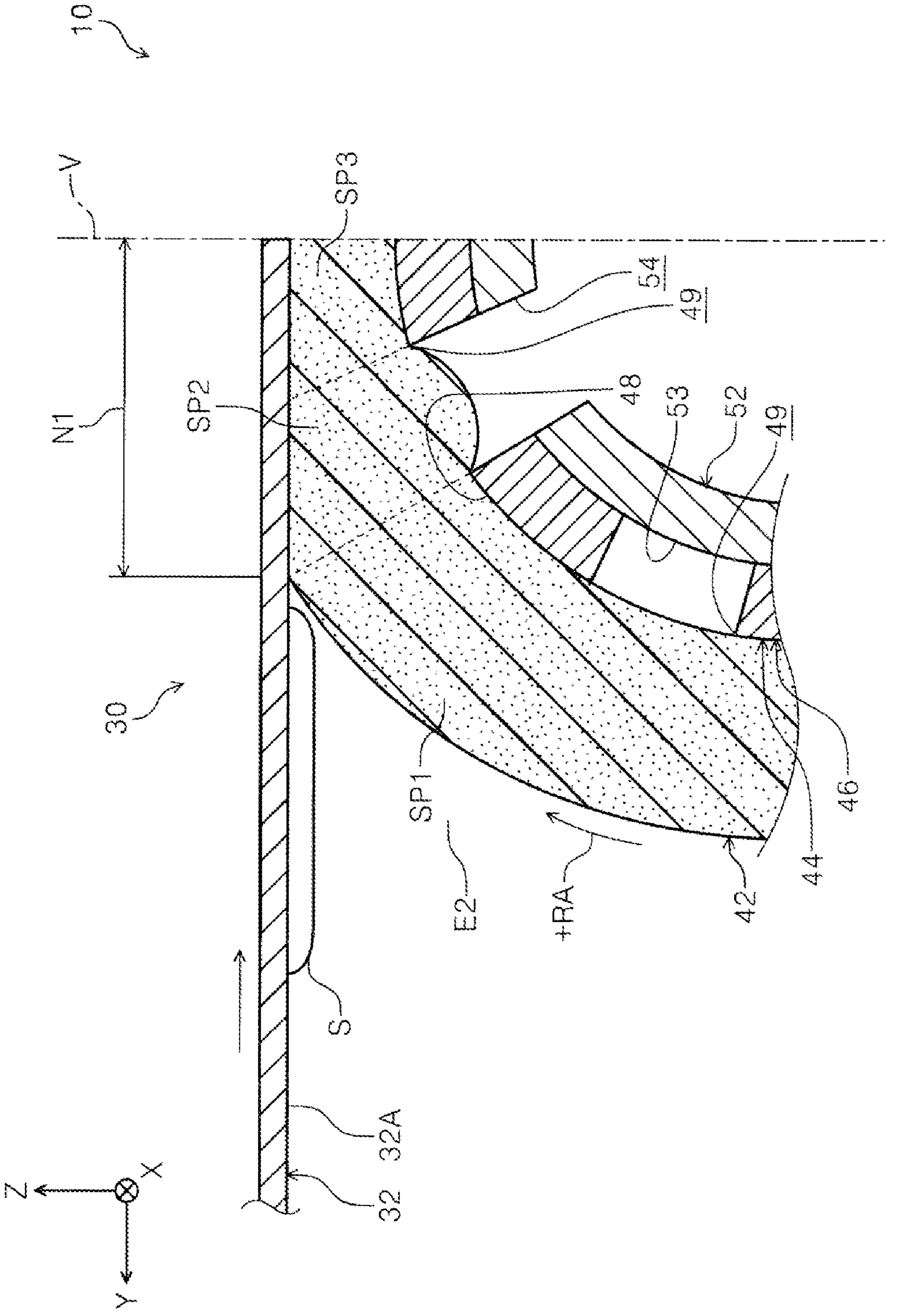
FIG. 3 is an enlarged schematic diagram of a sponge and a glue belt of the printer according to the first embodiment.

As illustrated in FIG. 3, when the opening 49 and the communication port 54 are in a communicated state due to the rotation of the sponge 42 and the rotary member 46, the portion of the sponge 42 that faces the opening 49 expands into the opening 49 and the communication port 54 due to the action of the negative pressure.

In the portions constituting the sponge 42, the portion that is not substantially deformed in the +RA direction is referred to as an undeformed portion SP1, the portion that expands into the opening 49 is referred to as an expanding portion SP2, and the portion that is compressed and does not expand is referred to as a compressed portion SP3. Note that a boundary line between the undeformed portion SP1 and the expanding portion SP2, and a boundary line between the expanding portion SP2 and the compressed portion SP3 are respectively represented by dashed lines.

In the transport unit 30, the ability to clean the outer peripheral surface 32A means the ability to absorb the cleaning liquid S in the sponge 42, that is, the ability to collect the cleaning liquid S. The ability to collect the cleaning liquid S in the sponge 42 is higher as the density of the sponge 42 decreases. That is, as the volume of each cell of the sponge 42 increases, an amount of the cleaning liquid S contained inside the cell is increased.

Here, since the compressed portion SP3 has a higher density of the sponge 42 than the undeformed portion SP1, the ability to collect the cleaning liquid S decreases compared to the undeformed portion SP1.

Although the expanding portion SP2 is partially compressed by receiving a reaction force from the glue belt 32, the portion thereof that faces the opening 49 expands, and thus an increase in density is suppressed. Thus, the expanding portion SP2 suppresses the reduction in the ability to collect the cleaning liquid S compared to the undeformed portion SP1.

That is, the expanding portion SP2 is compressed by contact with the glue belt 32, but the ability to collect the cleaning liquid S is higher than in the compressed portion SP3. Furthermore, in the expanding portion SP2, a volume thereof increases during expansion, a negative pressure is generated, and thus the cleaning liquid S is easily sucked.

As illustrated in FIG. 2, the sponge 42 that has absorbed the cleaning liquid S is rotated in the +RA direction. Then, the sponge 42 is compressed by being sandwiched between the squeezing member 56 and the rotary member 46 while being rotated. That is, due to the sponge 42 being squeezed by the squeezing member 56, the cleaning liquid S is discharged to the outside of the sponge 42. Thus, the ability to collect the cleaning liquid S in the sponge 42 is close to collection ability in the uncompressed state before rotation.

As described above, according to the transport unit 30, when the sponge 42 comes into contact with the glue belt 32, a compressed portion of the sponge 42 is generated between the support surface 48 and the glue belt 32. Here, a part of the sponge 42 is released from the compressed state by expanding into the opening 49 provided in the support surface 48. That is, it is possible to create a portion less likely to be compressed in a part of the sponge 42. The portion less likely to be compressed has a lower density and a higher ability to absorb the cleaning liquid S than the compressed portion. Additionally, the cleaning liquid S seeping out from the compressed portion to the glue belt 32 can be suppressed by moving the cleaning liquid S in the compressed portion of the sponge 42 to the inside of the portion less likely to be compressed. Thus, it is possible to suppress a decrease in the ability of the sponge 42 to clean the outer peripheral surface 32A of the glue belt 32.

In the sponge 42, since the sponge 42 is compressed when the cleaning liquid S is removed from the glue belt 32, a seeping-out action of returning the cleaning liquid S to the glue belt 32 is more likely to occur rather than an action of absorbing the cleaning liquid S. Here, in the sponge 42 driven to rotate in which the rotary member 46 rotates in accordance with the transport operation of the glue belt 32, the seeping-out of the cleaning liquid S onto the glue belt 32 occurs more conspicuously than a configuration using the sponge 42 that is not rotated.

According to the transport unit 30, even when the sponge 42 driven to rotate is used, a part of the sponge 42 expands into the opening 49, and thus the state of the sponge 42 changes from the compressed state to the released state. Thus, since the density of the sponge 42 is reduced, and thus the ability to absorb the cleaning liquid S is ensured, the decrease in the ability of the sponge 42 to clean the outer peripheral surface 32A of the glue belt 32 can be suppressed.

According to the transport unit 30, when the sponge 42 comes into contact with the squeezing member 56, the communication port 54 is located in the second region A2 rather than the first region A1, and thus the state of the sponge 42 is maintained in the compressed state. Thus, the sponge 42 in contact with the squeezing member 56 is less likely to be released from the compressed state, and thus, it is possible to suppress a decrease in the ability to squeeze the sponge 42 with the squeezing member 56.

According to the transport unit 30, a part of the sponge 42 released from the compressed state in the opening 49 expands further to the inside of the shaft member 52 due to the negative pressure generated by the suction unit 64 inside the shaft member 52. Thus, since the sponge 42 can easily absorb the cleaning liquid S, the ability to collect the cleaning liquid S in a part of the sponge 42 can be further enhanced.

According to the printer 10, when the sponge 42 comes into contact with the glue belt 32, a compressed portion of the sponge 42 is generated between the support surface 48 and the glue belt 32. Here, a part of the sponge 42 is released from the compressed state by expanding into the opening 49 provided in the support surface 48. That is, it is possible to create the portion less likely to be compressed in a part of the sponge 42. This portion less likely to be compressed has a lower density and a higher ability to absorb the cleaning liquid S than the compressed portion. Additionally, the cleaning liquid S seeping outward from the compressed portion can be suppressed by moving the cleaning liquid S that seeps out from the compressed portion of the sponge 42 to the portion less likely to be compressed. Thus, it is possible to suppress a decrease in the ability of the sponge 42 to clean the outer peripheral surface 32A of the glue belt 32.

Second Embodiment

Hereinafter, a transport unit 70 according to a second embodiment is specifically described. Note that configurations similar to those of the printer 10 and the transport unit 30 of the first embodiment are denoted by the same reference numerals, and descriptions thereof will be omitted.

Figure 4:
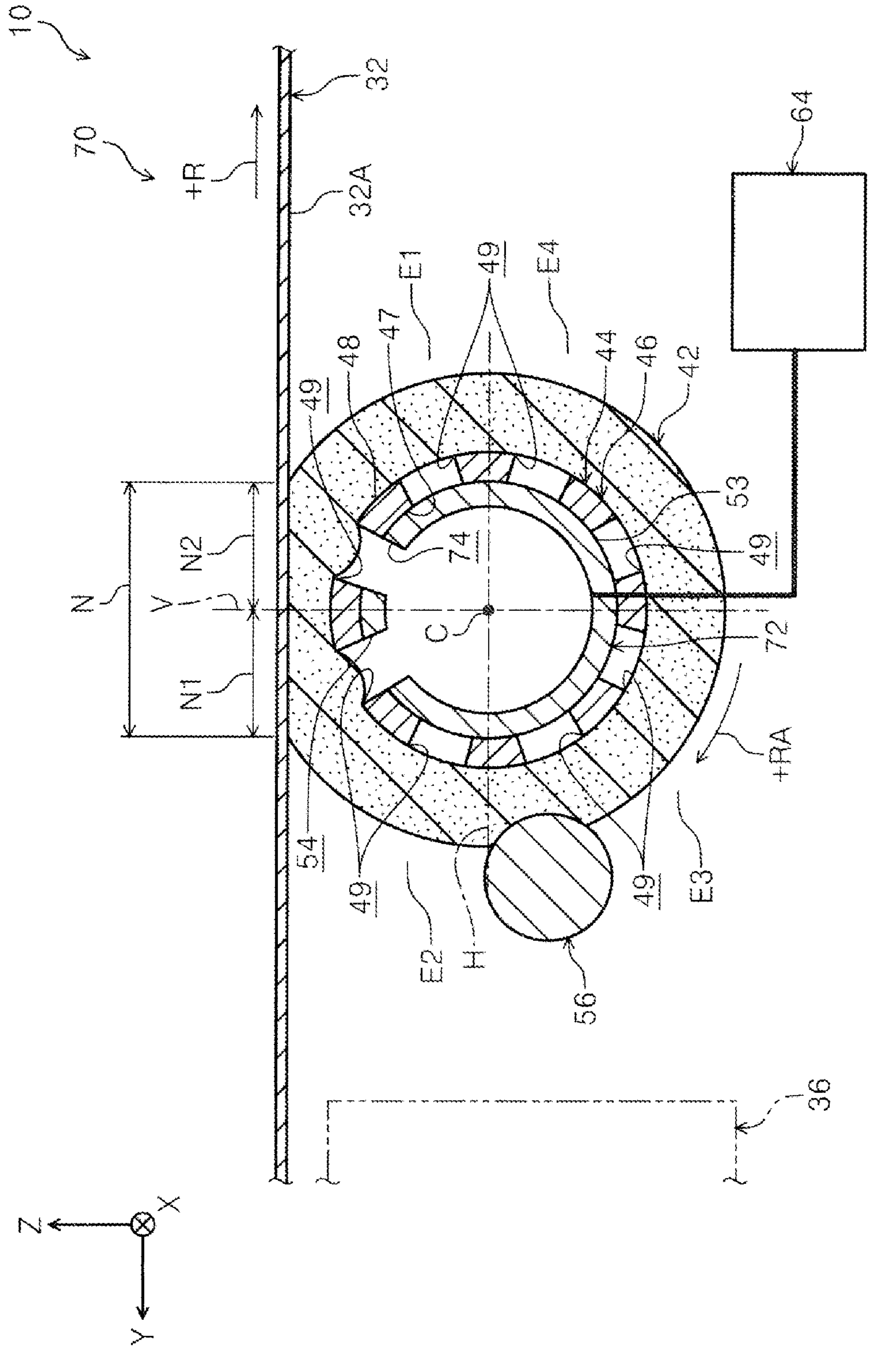
FIG. 4 is a schematic diagram of a cleaning unit and surroundings thereof in a printer according to a second embodiment.

As illustrated in FIG. 4, the transport unit 70 is provided in the printer 10 in place of the transport unit 30 (FIG. 1). The configuration other than the transport unit 70 in the printer 10 is similar to the configuration of the first embodiment. The transport unit 70 is an example of a transport device that transports a medium M.

The transport unit 70 includes a shaft member 72 instead of the shaft member 52 (FIG. 2) in the transport unit 30. Since the configuration other than the shaft member 72 is the same as the configuration of the transport unit 30, the description thereof will be omitted.

The shaft member 72 has a configuration in which a communication port 74 is added to the shaft member 52. Since the configuration other than the communication port 74 is the same as the configuration of the shaft member 52, the description thereof will be omitted. As an example, the communication port 54 and the communication port 74 arranged in the +RA direction are provided in the outer peripheral surface 53.

The communication port 74 is located downstream from the communication port 54 in the +RA direction. The communication port 54 and the communication port 74 are substantially line-symmetrical with respect to the vertical line V when seen in the +X direction. A size of the communication port 74 is substantially the same as that of the communication port 54.

As an example, the communication port 74 can be brought into communication with one opening 49 as the rotary member 46 rotates. The communication port 74 allows communication between the inside and the outside of the shaft member 52. As an example, the communication port 74 is located inside the region E1 when seen in the +X direction. The communication port 74 is located a position closer to the vertical line V than the lateral line H inside the region E1.

Also, the communication port 74 is provided in the second region A2 (FIG. 2). An opening width of the communication port 74 in the +RA direction is substantially equal to an opening width of the opening 49 in the +RA direction, as an example.

A portion of the sponge 42 that faces the communication port 74 and the opening 49 which are in a communicated state is located inside the downstream region N2 and is gradually released from the compressed state along with rotation.

Next, the operation of the transport unit 70 will be described.

Figure 5:
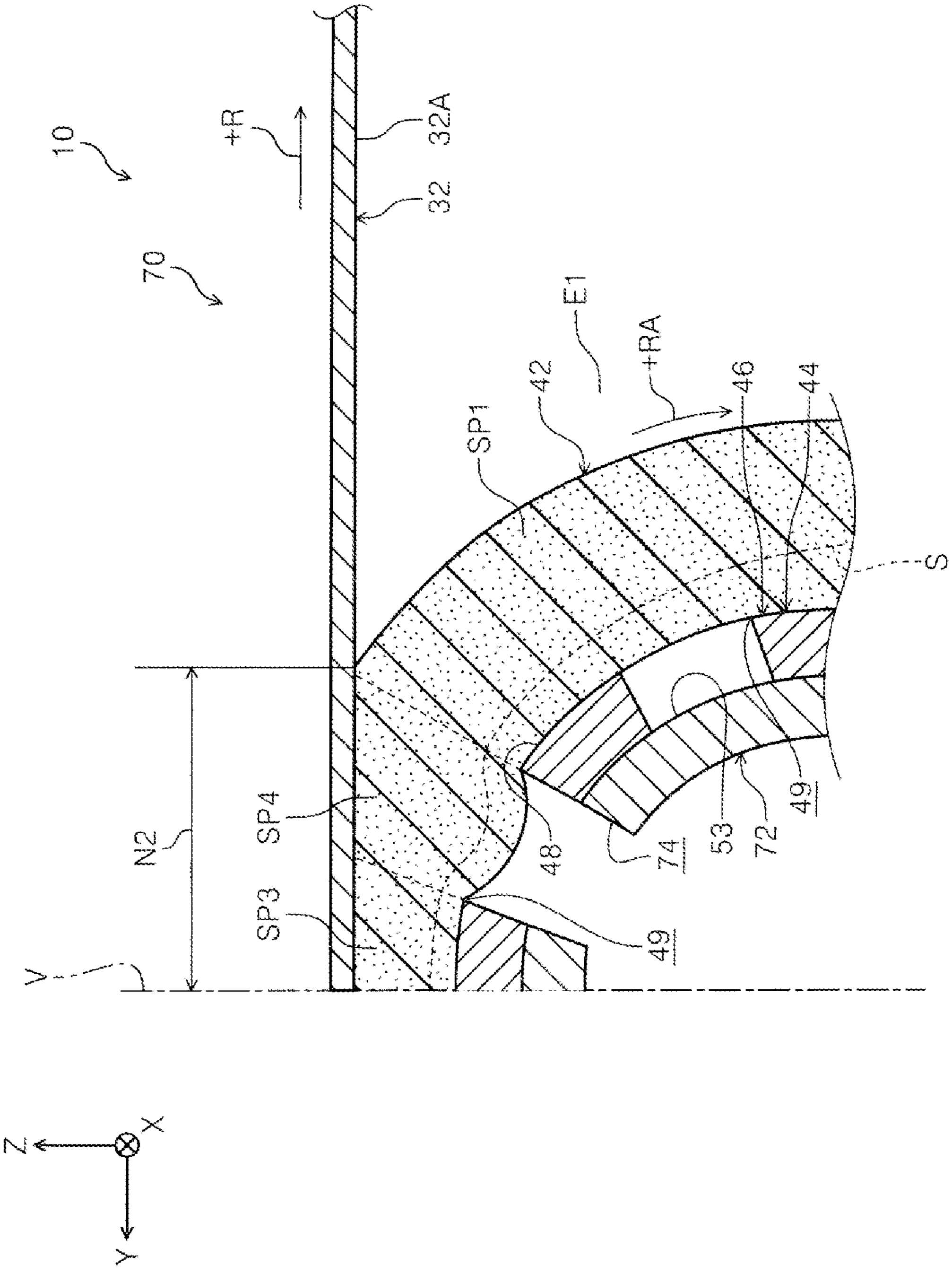
FIG. 5 is an enlarged schematic diagram of a sponge and a glue belt of the printer according to the second embodiment.

As illustrated in FIG. 5, when the opening 49 and the communication port 74 are brought into communication with each other due to the rotation of the sponge 42 and the rotary member 46, the portion of the sponge 42 that faces the opening 49 expands into the opening 49 and the communication port 74 due to the action of the negative pressure.

Note that in the portions constituting the sponge 42, the portion that is inside the downstream region N2 and expands into the opening 49 is distinguished as an expanding portion SP4. Note that a boundary line between the undeformed portion SP1 and the expanding portion SP4, and a boundary line between the expanding portion SP4 and the compressed portion SP3 are respectively represented by dashed lines.

Since a distance between the expanding portion SP4 and the glue belt 32 increases toward the downstream in the +RA direction, the expanding portion SP4 is gradually released from the compressed state along with rotation. Furthermore, a portion of the expanding portion SP4 that faces the opening 49 expands, and thus a density thereof is reduced. Thus, since a volume of the expanding portion SP4 is increased during expansion, and thus a negative pressure is generated, the cleaning liquid S can be easily sucked.

In this way, in the transport unit 70, the ability to collect the cleaning liquid S can be enhanced by applying a negative pressure to the sponge 42 in a portion of the downstream region N2 in which the communication port 74 is provided. Thus, the cleaning liquid S collected in the compressed portion SP3 adhering again to the outer peripheral surface 32A in the expanding portion SP4 can be suppressed.

Third Embodiment

Hereinafter, a transport unit 80 according to a third embodiment is specifically described. Note that the same reference numerals are assigned to the same configurations as those of the printer 10 and the transport units 30 and 70 of the first and second embodiments, and the description thereof will be omitted.

Figure 6:
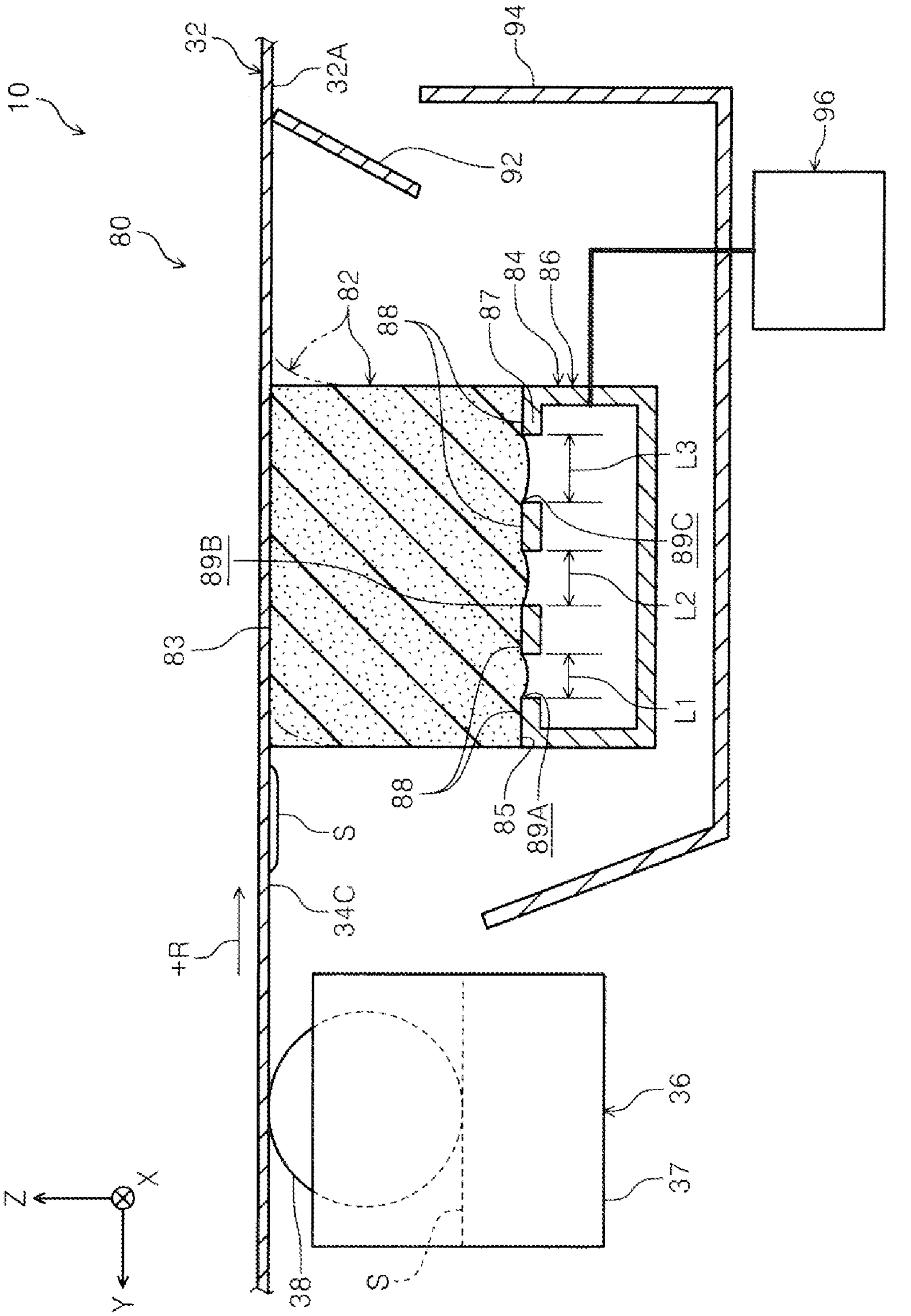
FIG. 6 is a schematic diagram of a cleaning unit of a printer according to a third embodiment.

As illustrated in FIG. 6, the transport unit 80 is provided in the printer 10 in place of the transport unit 30 (FIG. 1). The configuration other than the transport unit 80 in the printer 10 is similar to the configuration of the first embodiment.

The transport unit 80 is an example of a transport device that transports a medium M. The transport unit 80 includes a glue belt 32, a cleaning unit 36, a sponge 82, and a support unit 84. A cleaning blade 92, a collection tank 94, and a suction unit 96 are also provided in the transport unit 80.

The sponge 82 is provided at a position at which it faces the lower surface portion 34C in the −Z direction and at a position at which is located downstream of the cleaning unit 36 in the +R direction, that is, in the −Y direction. The sponge 82 is a prismatic member that extends in the X direction. The sponge 82 is a porous elastic body and has an open cell structure consisting of a plurality of cells not illustrated. Each of the cells functions as a chamber capable of accommodating the cleaning liquid S. An upper surface 83 of the sponge 82 in the +Z direction is located along an X-Y plane. The entire upper surface 83 comes into contact with the outer peripheral surface 32A.

When the sponge 82 is compressed in a state in which air and the cleaning liquid S are accommodated in each of the cells, the air and the cleaning liquid S inside of each of the cells is discharged to the outside. Note that when the sponge 82 is compressed, some of the air and the cleaning liquid S may move to other cells, and some of the air and the cleaning liquid S may remain inside the sponge 82. Also, when the sponge 82 returns from the compressed state to the uncompressed state, a negative pressure is generated inside each of the cells, and thus the air and the cleaning liquid S can be absorbed.

The sponge 82 is supported by the support unit 84 which will be described below. Thus, the upper surface 83 of the sponge 82 is in contact with the outer peripheral surface 32A cleaned by the cleaning unit 36. Note that the sponge 82 is fixed to the support unit 84. Therefore, the glue belt 32 slides against the sponge 82. Also, the sponge 82 is in the compressed state of being compressed in the Z direction by being sandwiched between the support unit 44 and the glue belt 32.

The support unit 84 is configured to include, for example, a chamber 86 and a bracket (not illustrated) that fixes the chamber 86 to a portion of the device main body 12 (FIG. 1).

The chamber 86 is a hollow member that extends in the X direction. The chamber 86 includes an upper wall 87 that constitutes a ceiling portion of the chamber 86. The upper wall 87 includes a support surface 88 that is an upper surface in the +Z direction.

The support surface 88 is a plane along the X-Y plane as an example. Openings 89A, 89B, and 89C are provided in the support surface 88. A lower surface 85 of the sponge 82 in the −Z direction is bonded to a portion of the support surface 88 other than the openings 89A, 89B, and 89C. In this way, the support unit 84 includes the support surface 88 capable of supporting the sponge 82.

The openings 89A, 89B, and 89C are arranged and are spaced apart in the Y direction when seen in the +X direction. Each of the openings 89A, 89B, and 89C is provided as an end portion of a through hole that passes through the upper wall 87 in the Z direction. Also, each of the openings 89A, 89B, and 89C is provided in a slit shape that extends in the X direction.

The opening 89A is located in the +Y direction from the center of the upper wall 87 in the Y direction. A length of the opening 89A in the Y direction is L1 (mm).

The opening 89B is located at the center of the upper wall 87 in the Y direction. A length of the opening 89B in the Y direction is L2 (mm).

The opening 89C is located in the −Y direction from the center of the upper wall 87 in the Y direction. A length of the opening 89C in the Y direction is L3 (mm).

As an example, $L1<L2<L3$.

Note that a plurality of openings 89A, 89B, and 89C may be provided at intervals not only in the Y direction but also in the X direction. Note that as in the openings 89A, 89B, and 89C, the number of openings provided in the support surface 88 is not limited to three, and may be singular or plural. Also, the openings provided in the support surface 88 are not limited to those in which each has a different length in the Y direction, and may be those in which all have the same length in the Y direction, or may be those in which some have the same length and the rest has a different length.

The cleaning blade 92 is located in the −Y direction with respect to the sponge 82 and downstream in the +R direction. A tip end portion of the cleaning blade 92 comes into contact with the outer peripheral surface 32A. In this way, the cleaning blade 92 is capable of collecting foreign matter, and the like that are not collected by the sponge 82. The collection tank 94 is formed in a box shape that opens in the +Z direction. The collection tank 94 covers a part of the sponge 82, the chamber 86, and a part of the cleaning blade 92 when seen in the +X direction. The collection tank 94 can collect the cleaning liquid S and the like that flows down along the side of the sponge 82 and the cleaning liquid S and the like scraped by the cleaning blade 92.

The suction unit 96 sucks a gas inside the chamber 86. The gas includes not only air, but also gas other than air. The suction unit 96 is coupled to the chamber 86. In the suction unit 96, an internal state of the chamber 86 is brought into a negative pressure state by rotating a fan (not illustrated). The suction unit 96 can change the negative pressure by changing an air volume. That is, the suction unit 96 can perform absorption to an extent that a part of the sponge 82 expands into the openings 89A, 89B, and 89C. Furthermore, the suction unit 96 includes a collection unit (not illustrated). Additionally, the suction unit 96 is configured to be able to collect the cleaning liquid S and the like sucked inside the chamber 86 during suction at the collection unit.

Next, the operation of the transport unit 80 will be described.

As illustrated in FIG. 6, the sponge 82 collects the cleaning liquid S and the like adhering to the outer peripheral surface 32A by coming into contact with the outer peripheral surface 32A after cleaning by the cleaning unit 36.

Specifically, the cleaning liquid S and the like permeate the inside of the sponge 82, and thus the cleaning liquid S is collected in the sponge 82. The cleaning liquid S and the like collected in the sponge 82 flow down inside the sponge 82 in the −Z direction due to an action of its own weight and an action of absorption by the suction unit 96.

The portions of the sponge 82 that face the openings 89A, 89B, 89C expand into the openings 89A, 89B, and 89C and the chamber 86 due to the action of the negative pressure. In the portion of the sponge 82 that expands, the density of the sponge 82 decreases over almost the entirety thereof in the Z direction. That is, in the portion of the sponge 82 that expands, since an amount of the cleaning liquid S that can be held increases due to an increase in volume during expansion, it is possible to suppress movement of some of the cleaning liquid S from the sponge 82 to the outer peripheral surface 32A.

As described above, according to the transport unit 80, when the sponge 82 comes into contact with the glue belt 32, a compressed portion of the sponge 82 is generated between the support surface 88 and the glue belt 32. Here, a part of the sponge 82 expands into the openings 89A, 89B, and 89C provided in the support surface 88 and is thus released from the compressed state. That is, it is possible to create a portion less likely to be compressed in a part of the sponge 82. The portion less likely to be compressed has a lower density and a higher ability to absorb the cleaning liquid S than the compressed portion. Additionally, the cleaning liquid S seeping out from the compressed portion to the glue belt 32 can be suppressed by moving the cleaning liquid S in the compressed portion of the sponge 82 to the inside of the portion less likely to be compressed. Thus, it is possible to suppress a decrease in the ability of the sponge 82 to clean the outer peripheral surface 32A of the glue belt 32.

Also, according to the transport unit 80, the state of the end portion in the −Z direction that is a part of the sponge 82 is released from the compressed state in the openings 89A, 89B, and 89C, and thus a part of the sponge 82 expands into the openings. Furthermore, a part of the sponge 82 expands further into the chamber 86 as the gas inside the chamber 86 is sucked by the suction unit 96. Therefore, a density of a part of the sponge 82 is reduced, and the ability to absorb the cleaning liquid S is increased. That is, since the sponge 82 is more likely to absorb the cleaning liquid S, the ability to collect the cleaning liquid S can be enhanced in a part of the sponge 82.

Furthermore, according to the transport unit 80, the lengths L1, L2, and L3 of the openings 89A, 89B, and 89C in the Y direction increase in order toward the downstream direction in the +R direction. In other words, the ability of the sponge 82 to collect the cleaning liquid S is enhanced toward the downstream in the +R direction. Thus, as indicated by a two-dot chain line, even when the upper end portion of the sponge 82 in the +Z direction is deformed in the +R direction due to an action of a frictional force with the glue belt 32, a portion of the sponge 82 that is deformed in the +R direction and a portion in the vicinity of the portion are likely to be maintained in a state in which the ability to collect the cleaning liquid S is relatively high. Therefore, the cleaning liquid S and the like are less likely to remain on the outer peripheral surface 32A.

Fourth Embodiment

Hereinafter, a transport unit 100 according to a fourth embodiment is specifically described. Note that configurations similar to those of the printer 10 and the transport units 30, 70, and 80 of the first, second, and third embodiments are denoted by the same reference numerals, and the descriptions thereof will be omitted.

Figure 7:
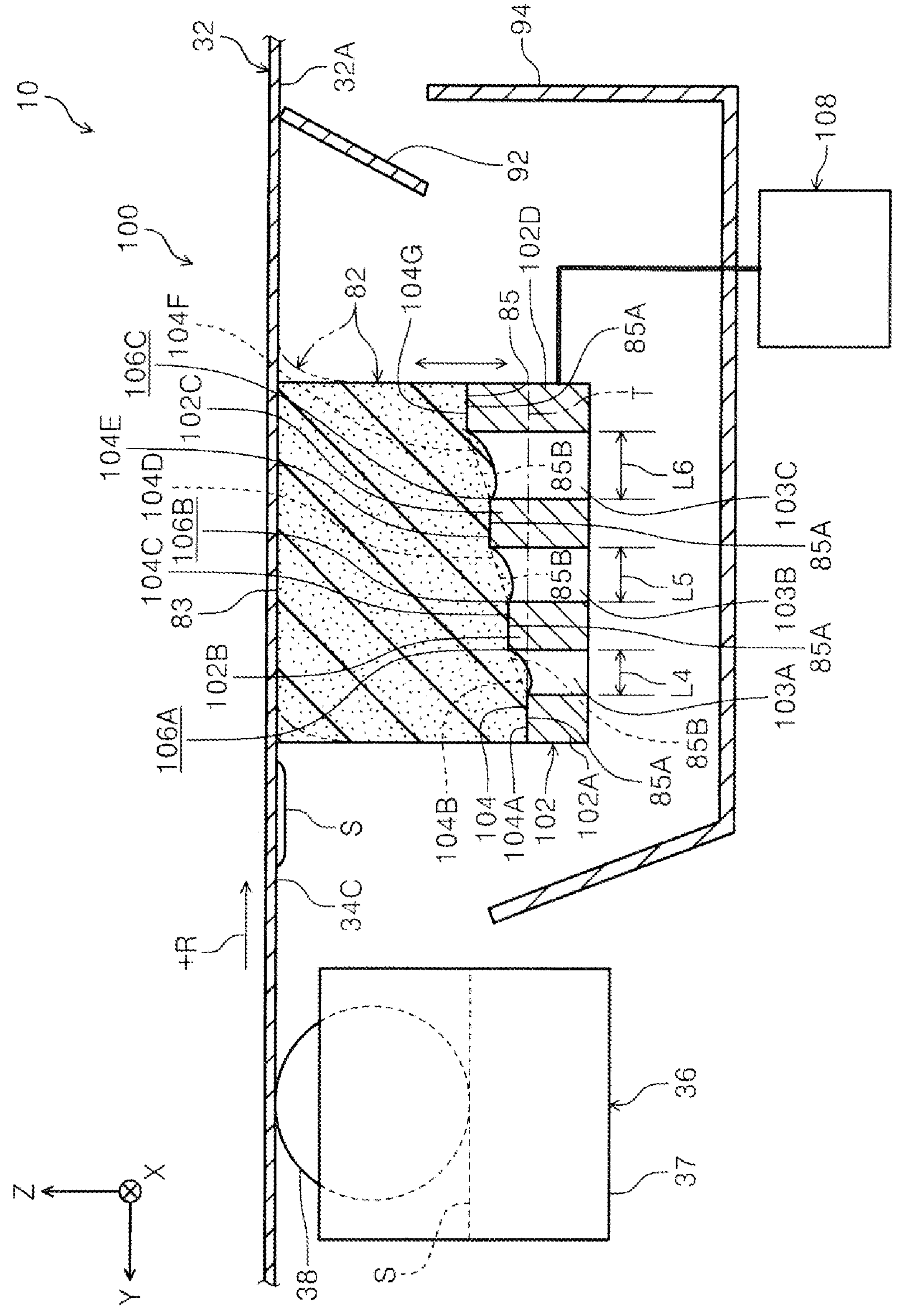
FIG. 7 is a schematic diagram of a cleaning unit of a printer according to a fourth embodiment.

As illustrated in FIG. 7, the transport unit 100 is provided in the printer 10 in place of the transport unit 30 (FIG. 1). The configuration other than the transport unit 100 in the printer 10 is similar to the configuration in the first embodiment.

The transport unit 100 is an example of a transport device that transports a medium M. The transport unit 100 includes a glue belt 32, a cleaning unit 36, a sponge 82, and a support member 102, and a lifting unit 108. A cleaning blade 92 and a collection tank 94 are also provided in the transport unit 100.

The sponge 82 is provided at a position at which it faces the lower surface portion 34C in the −Z direction and at a position at which it located downstream of the cleaning unit 36 in the +R direction, that is, in the −Y direction. The entire upper surface 83 comes into contact with the outer peripheral surface 32A. The sponge 82 is supported on a support surface 104 of the support member 102 which will be described below. Also, the sponge 82 can be compressed in the Z direction by being sandwiched between the support member 102 and the glue belt 32.

The glue belt 32 slides against the sponge 82.

When the sponge 82 is sandwiched between the support member 102 and the glue belt 32 which will be described below, a lower surface 85 is deformed into a shape different from a shape along an X-Y plane. Specifically, the lower surface 85 after deformation includes a planar portion 85A along the X-Y plane when seen in the +X direction and an inclined portion 85B that extends in an oblique direction intersecting the Y direction.

The planar portion 85A is provided at four locations on the lower surface 85 as an example. The inclined portion 85B is provided at three locations on the lower surface 85 as an example. Note that the entire lower surface 85 may be constituted by one inclined portion 85B.

Among the four planar portions 85A, the planar portion 85A located at the end portion in the −Y direction is adhered to the support surface 104 which will be described below.

The support member 102 is an example of the support unit including the support surface 104 capable of supporting the sponge 82. The support member 102 is longer in the X direction than the glue belt 32. The support member 102 includes vertical wall portions 102A, 102B, 102C, and 102D, and pairs of side wall portions 103A, 103B, and 103C that couple both ends in the X direction of each of the vertical wall portions 102A, 102B, 102C, and 102D in the Y direction when seen in the +X direction. An interval between the pair of side wall portions 103A in the X direction may be greater than or equal to a dimension of the sponge 82 in the X direction. The pairs of side wall portions 103B and 103C are also similar.

The vertical wall portion 102A is a portion located at an end portion of the support member 102 in the +Y direction and extending in the +Z direction.

The vertical wall portion 102B is located in the −Y direction with an interval from the vertical wall portion 102A and extends in the +Z direction. The vertical wall portion 102B is higher in the +Z direction than the vertical wall portion 102A.

The vertical wall portion 102C is located in the −Y direction with an interval from the vertical wall portion 102B and extends in the +Z direction. The vertical wall portion 102C is higher in the +Z direction than the vertical wall portion 102B.

The vertical wall portion 102D is located in the −Y direction with an interval from the vertical wall portion 102C and extends in the +Z direction. The vertical wall portion 102D is higher in the +Z direction than the vertical wall portion 102C.

End surfaces of the vertical wall portions 102A, 102B, 102C, and 102D in the −Z direction are aligned to the same height. In other words, the support member 102 has a shape with a plurality of steps at an upper end in the +Z direction.

The support surface 104 is an upper surface of the support member 102 in the +Z direction. As an example, the support surface 104 includes at least a plane 104A, a plane 104C, a plane 104E, and a plane 104G. Also, openings 106A, 106B, and 106C are provided in the support surface 104. Also, the support member 102 includes an inclined surface 104B, an inclined surface 104D, and an inclined surface 104F.

The plane 104A is an upper surface of the vertical wall portion 102A. The inclined surface 104B is an upper surface of the side wall portion 103A. The plane 104C is an upper surface of the vertical wall portion 102B. The inclined surface 104D is an upper surface of the side wall portion 103B. The plane 104E is an upper surface of the vertical wall portion 102C. The inclined surface 104F is an upper surface of the side wall portion 103C. The plane 104G is an upper surface of the vertical wall portion 102D.

In the embodiment, an end portion of the lower surface 85 in the −Y direction is bonded to the plane 104G as an example. Also, the lower surface 85 is not bonded to the plane 104A, the inclined surface 104B, the plane 104C, the inclined surface 104D, the plane 104E, and the inclined surface 104F.

Before the sponge 82 is compressed in the Z direction, only an end portion of the lower surface 85 in the −Y direction is supported by the support member 102. Also, the sponge 82 is supported by the support member 102 except for the portions facing the openings 106A, 106B, and 106C in a state in which it is compressed in the Z direction.

The opening 106A is provided between the vertical wall portion 102A and the vertical wall portion 102B when seen in the +X direction. The opening 106A is provided as an end portion of a through hole that passes through the support member 102 in the Z direction. The opening 106A is provided in a slit shape that extends in the X direction. The side wall portion 103A is located outside the opening 106A in the X direction. A length of the opening 106A in the Y direction is L4 (mm).

The opening 106B is provided between the vertical wall portion 102B and the vertical wall portion 102C when seen in the +X direction. The opening 106B is provided as an end portion of a through hole that passes through the support member 102 in the Z direction. The opening 106B is provided in a slit shape that extends in the X direction. The side wall portion 103B is located outside the opening 106B in the X direction. A length of the opening 106B in the Y direction is L5 (mm).

The opening 106C is provided between the vertical wall portion 102C and the vertical wall portion 102D when seen in the +X direction. The opening 106C is provided as an end portion of a through hole that passes through the support member 102 in the Z direction. The opening 106C is provided in a slit shape that extends in the X direction. The side wall portion 103C is located outside the opening 106C in the X direction. A length of the opening 106C in the Y direction is L6 (mm).

Here, as an example, $L4<L5<L6$.

Note that a plurality of openings 106A, 106B, and 106C may be provided at intervals not only in the Y direction but also in the X direction. The number of openings provided in the support surface 104 is not limited to three, and may be singular or plural. Also, the openings provided in the support surface 104 are not limited to those in which each has a different length in the Y direction, and may be those in which all have the same length in the Y direction, or may be those in which some have the same length and the rest has a different length.

The lifting unit 108 includes a cam and a motor which are not illustrated. As an example, the lifting unit 108 supports both end portions of the support member 102 in the X direction. A lifting operation of the lifting unit 108 is controlled by the control unit 20 (FIG. 1).

In an initial state before the lifting unit 108 is operated, the support member 102 is at a lowered position in the −Z direction. In this state, the lower surface 85 is along the X-Y plane as indicated by an alternated long and short dash line T.

Next, the operation of the transport unit 100 will be described.

As illustrated in FIG. 7, the support member 102 moves upward in the +Z direction by operating the lifting unit 108.

A portion of the sponge 82 that does not face the openings 106A, 106B, and 106C is in the compressed state in the Z direction by being sandwiched between the glue belt 32 and the support member 102.

On the other hand, portions of the sponge 82 that face the openings 106A, 106B, and 106C are in the released state and are thus less likely to be compressed. Thus, the portions of the sponge 82 that face the openings 106A, 106B, and 106C expand into the openings 106A, 106B, and 106C as the support member 102 moves upward.

The sponge 82 collects the cleaning liquid S and the like adhering to the outer peripheral surface 32A by coming into contact with the outer peripheral surface 32A after cleaning by the cleaning unit 36.

Here, in the portions of the sponge 82 that expand, the density of the sponge 82 decreases over almost the entirety thereof in the. That is, since a volume of the portion of the sponge 82 that expands increases during expansion, and the amount of cleaning liquid S that can be held increases, it is possible to suppress movement of some of the cleaning liquid S from the sponge 82 to the glue belt 32.

As described above, according to the transport unit 100, when the sponge 82 comes into contact with the glue belt 32, a compressed portion of the sponge 82 is generated between the support surface 104 and the glue belt 32. Here, a part of the sponge 82 is released from the compressed state by expanding into the openings 106A, 106B, and 106C provided in the support surface 104. That is, it is possible to create a portion less likely to be compressed in a part of the sponge 82. The portion less likely to be compressed has a lower density and a higher ability to absorb the cleaning liquid S than the compressed portion. Additionally, the cleaning liquid S seeping out from the compressed portion to the glue belt 32 can be suppressed by moving the cleaning liquid S in the compressed portion of the sponge 82 to the inside of the portion less likely to be compressed. Thus, it is possible to suppress a decrease in the ability of the sponge 82 to clean the outer peripheral surface 32A of the glue belt 32.

Also, according to the transport unit 100, the lengths L4, L5, and L6 of the openings 106A, 106B, and 106C in the Y direction increase in order toward the downstream direction in the +R direction. In other words, the ability of the sponge 82 to collect the cleaning liquid S is enhanced toward the downstream in the +R direction. Thus, as indicated by a two-dot chain line, even when the upper end portion of the sponge 82 in the +Z direction is deformed in the +R direction due to an action of a frictional force with the glue belt 32, a portion of the sponge 82 that is deformed in the +R direction and a portion in the vicinity of the portion are likely to be maintained in a state in which the ability to collect the cleaning liquid S is relatively high. Therefore, the cleaning liquid S and the like are less likely to remain on the outer peripheral surface 32A.

Furthermore, according to the transport unit 100, in a so-called maintenance mode in which the printer 10 does not perform recording, the support member 102 can be moved up and down in the Z direction as the glue belt 32 moves. Here, when the support member 102 moves down, a negative pressure is generated inside the sponge 82 by transition of the sponge 82 from the compressed state to the released state, and thus the cleaning liquid S can be easily collected compared to a configuration in which the support member 102 does not move up and down.

In addition, according to the transport unit 100, heights of the vertical wall portions 102A, 102B, 102C, 102D are different from each other, and the height of the vertical wall portion 102D is the highest. Therefore, when the support member 102 moves up and down in the Z direction, a degree of compression of the sponge 82 is the highest at a downstream end in the +R direction and the vicinity thereof and is the lowest at an upstream end and the vicinity thereof. Thus, the cleaning liquid S collected in a downstream portion of the sponge 82 in the +Y direction easily flows to the upstream portion which has a larger volume than the downstream portion. Due to such actions, it is possible to suppress movement of the cleaning liquid S collected in the sponge 82 from the downstream portion of the sponge 82 in the +R direction to the glue belt 32.

Modified Example

Although the transport units 30, 70, 80, and 100 and the printer 10 according to the first, second, third, and fourth embodiments of the present disclosure are basically configured as described above, it is also possible to change, omit, or combine partial configurations without departing from the gist of the present disclosure. Hereinafter modified examples are described.

In the transport unit 30, a drive unit for driving the rotary member 46 may be provided to rotate the rotary member 46 in a direction opposite to the +RA direction. In this case, the communication port 74 may be provided instead of the communication port 54. When a plurality of communication ports are provided, one of the plurality of communication ports may be provided in the first region A1.

The shaft member 52 may be a solid, that is, a cylindrical member. Also, a recess portion may be provided in an outer peripheral portion of the solid shaft member, and the solid shaft member may be disposed such that the recess portion and the opening are brought into communication with each other. For example, when a thickness of the rotary member 46 in the radial direction is relatively thin, a space is increased by the recess portion in a position at which the recess portion and the opening are brought into communication with each other, and thus the sponge 42 can easily expand.

An opening area of the communication port 54 may be changed by movably providing a shutter member in the shaft member 52.

The transport unit 70 may be configured to include only the communication port 74 without the communication port 54. Furthermore, the drive unit for driving the rotary member 46 may be provided to rotate the rotary member 46 in the direction opposite to the +RA direction. The opening area of the communication port 54 and the communication port 74 may be changed by movably providing the shutter member in the shaft member 72.

In the transport unit 80, the opening area of the openings 89A, 89B, and 89C may be changed by providing the shutter member in the chamber 86.

The openings 49 may include those having different lengths in the +RA direction.

The openings 49, the openings 89A, 89B, and 89C and the openings 106A, 106B, and 106C are not limited to those forming openings of through holes, and may be those forming openings of bottomed recess portions. In other words, the openings 49, the openings 89A, 89B, and 89C and the openings 106A, 106B, and 106C may be configured as openings between adjacent protruding portions.

What is claimed is:

1. A transport device comprising:

a transport member configured to transport a medium;

a cleaning unit configured to clean the transport member with a liquid;

a support unit including a support surface configured to support a sponge that comes into contact with the transport member cleaned by the cleaning unit;

a shaft member that includes an outer peripheral surface facing an inner peripheral surface of the support unit and that is configured to rotatably support the support unit; and a negative pressure generating unit coupled to the shaft member and configured to generate a negative pressure inside the shaft member by reducing an air volume in an inside space of the shaft member, wherein at least one opening is provided in the support surface, and both ends of the shaft member along a longitudinal axis of the shaft member are closed.

2. The transport device according to claim 1, wherein the support unit is the shaft member and the sponge is provided on an outer periphery of the shaft member, is pressed against the transport member, and is configured to be driven to rotate with respect to the transport member.

3. The transport device according to claim 2, wherein the shaft member is a tubular member including the inner peripheral surface, a squeezing member configured to squeeze the sponge by pressing the sponge are provided, at least one communication port brought into communication with the at least one opening as the shaft member rotates is provided in the outer peripheral surface, and when a region of the outer peripheral surface aligned with the squeezing member in a radial direction of the shaft member is referred to as a first region and a region of the outer peripheral surface shifted in a rotational direction of the shaft member with respect to the first region is referred to as a second region, the communication port is provided in the second region.

4. The transport device according to claim 3, wherein the shaft member is a tubular member, and the communication port allows communication between an inside and an outside of the shaft member.

5. The transport device according to claim 1, wherein the support unit includes a chamber and a suction unit configured to suck a gas inside the chamber is included.

6. The transport device according to claim 1, wherein the negative pressure generating unit includes a fan configured to rotate to absorb the air volume from the inside space of the shaft member.

7. The transport device according to claim 1, wherein absorption of the air volume is performed to an extent that a part of the sponge expands into the at least one opening.

8. A droplet ejecting device comprising:

an ejecting unit configured to eject a droplet on a medium;

a transport member configured to transport the medium;

a cleaning unit configured to clean the transport member with a liquid;

a support unit including a support surface configured to support a sponge that comes into contact with the transport member cleaned by the cleaning unit;

a shaft member that includes an outer peripheral surface facing an inner peripheral surface of the support unit and that is configured to rotatably support the support unit; and a negative pressure generating unit configured to generate a negative pressure inside the shaft member is provided, wherein at least one opening is provided in the support surface, and both ends of the shaft member along a longitudinal axis of the shaft member are closed.

* * * * *